United States Patent
Hilgraf et al.

(10) Patent No.: US 8,573,895 B2
(45) Date of Patent: Nov. 5, 2013

(54) UNLOADING PLANT FOR LOW-LYING STORAGE BUNKERS

(75) Inventors: Peter Hilgraf, Hamburg (DE); Ansgar Reismann, Stade (DE); Reiner Fruehling, Hamburg (DE); Ernst Gaser, Stelle (DE)

(73) Assignee: Claudius Peters Projects GmbH, Buxtehude (DE)

( * ) Notice: Subject to any disclaimer, the term of this patent is extended or adjusted under 35 U.S.C. 154(b) by 485 days.

(21) Appl. No.: 12/838,014

(22) Filed: Jul. 16, 2010

(65) Prior Publication Data

US 2011/0033248 A1     Feb. 10, 2011

(30) Foreign Application Priority Data

Aug. 10, 2009  (EP) .................................. 09010297

(51) Int. Cl.
   *B65G 53/48*       (2006.01)
(52) U.S. Cl.
   USPC .................. 406/56; 406/55; 406/89; 406/93; 406/124; 406/144; 406/146
(58) Field of Classification Search
   USPC ................. 406/55, 56, 89, 93, 124, 144, 146; 366/10
   See application file for complete search history.

(56) References Cited

U.S. PATENT DOCUMENTS

| | | | | |
|---|---|---|---|---|
| 3,776,599 A | * | 12/1973 | Reuter | 406/15 |
| 4,067,623 A | * | 1/1978 | Klein et al. | 406/124 |
| 4,217,212 A | * | 8/1980 | Deal | 210/600 |
| 4,971,482 A | * | 11/1990 | Kjorling | 406/124 |
| 5,350,257 A | * | 9/1994 | Newbolt et al. | 406/75 |
| 5,634,713 A | * | 6/1997 | Abe | 366/102 |
| 7,186,062 B2 | * | 3/2007 | Snowdon | 406/121 |

FOREIGN PATENT DOCUMENTS

DE      1 262 899     3/1968

* cited by examiner

*Primary Examiner* — Joseph A Dillon, Jr.
(74) *Attorney, Agent, or Firm* — Morrison & Foerster LLP

(57) ABSTRACT

An apparatus includes a feed chamber for feeding of material from storage bunkers and a lifting device for lifting the material to a high level. The lifting device includes a delivery end to which a transport line for conveying the material away to a remote delivery point can be connected, a pressure vessel having a vertical conveyor that begins in the feed chamber and ends in a top region of the pressure vessel, and a discharge pipe beginning in a bottom region of the pressure vessel and leading out of the pressure vessel. The apparatus also includes a pressurizing device which pressurizes the pressure vessel via a first valve and activates a conveying air nozzle of the discharge pipe via a second valve, and a controller for filling the pressure vessel via the vertical conveyor, fluidizing the material via the pressurizing device, and conveying the material away via the transport line.

8 Claims, 4 Drawing Sheets

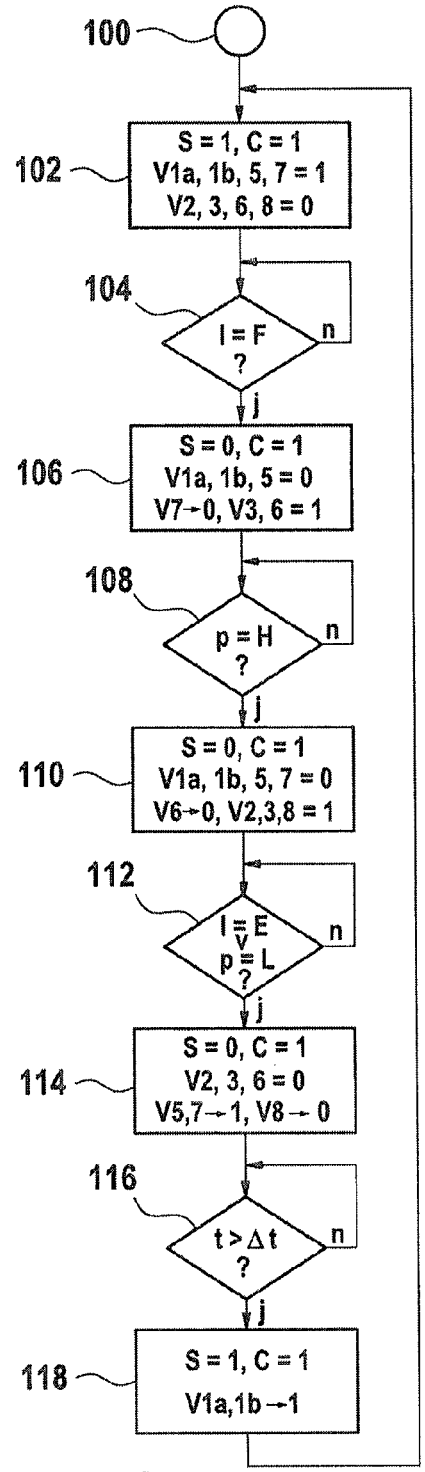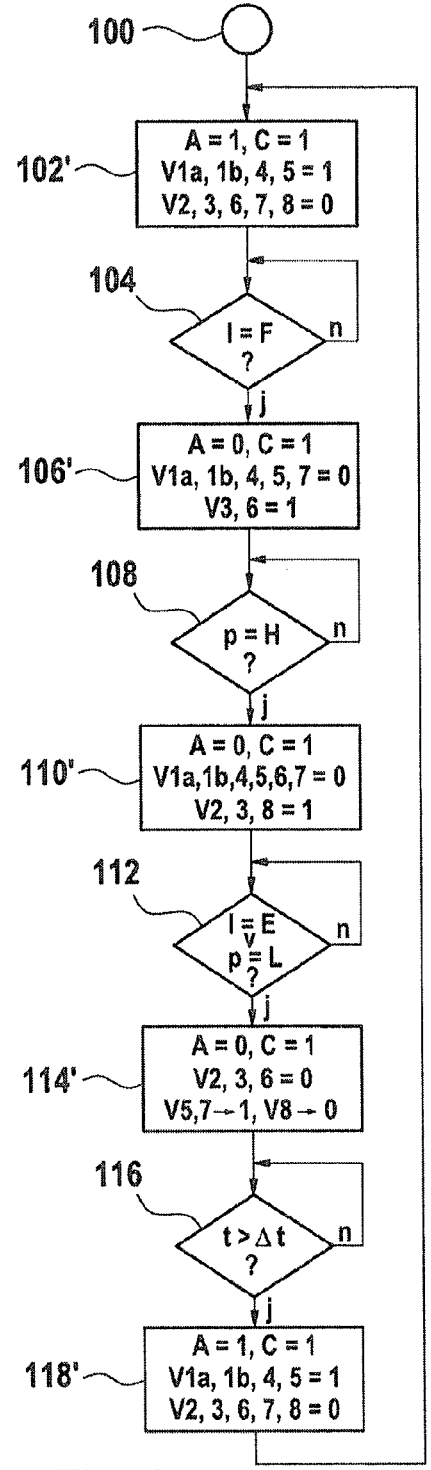
Fig. 4                    Fig. 6

UNLOADING PLANT FOR LOW-LYING STORAGE BUNKERS

REFERENCE TO RELATED APPLICATIONS

This application claims the priority of European Patent Application No. 09 010 297.1, filed Aug. 10, 2009, the contents of which are incorporated herein by reference.

FIELD OF THE INVENTION

The invention relates to an unloading plant for low-lying storage bunkers, comprising a feed chamber for the bottom-level feeding of material from storage bunkers and a vertical conveyor for lifting the material to a deck level with a delivery end, to which a transport line for conveying the material away to a spatially remote delivery point can be connected.

BACKGROUND OF THE INVENTION

Low-lying large vessels for the storage of material, in particular low-lying silos or bunkers, as are typical of the cargo holds of ships, require a special plant for unloading. Provided for this purpose at the bottom of the cargo hold are devices which take the material away from there and convey it to a feed chamber for a central lifting device. The latter conveys the bulk material delivered from the bunkers to a higher level, which in ships corresponds approximately to the deck level or the top edge of the bunker or silo.

It is known to use fluidizing bottoms for conveying the material from the bottom of the bunkers to the central point and to lift the material at the central point via a vertically arranged conveying worm to the deck level, from where it can be transported away via a pneumatic conveying device (DE 12 62 899 B). A disadvantage of this known plant is that it has only a low throughput, thereby resulting in long unloading times. In particular in the case of ships, this leads to considerable costs on account of the anchorage dues.

SUMMARY OF THE INVENTION

It is therefore the object of the present invention to provide an improved conveying plant which avoids or at least reduces these disadvantages.

The solution according to the invention lies in the features broadly disclosed herein. Advantageous developments are the subject matter of the disclosure.

In an unloading apparatus for low-lying storage bunkers, comprising a feed chamber for the bottom-level feeding of material from storage bunkers and a lifting device for lifting the material to a high level with a delivery end, to which a transport line for conveying the material away to a spatially remote delivery point can be connected, provision is made according to the invention for the lifting device to comprise a pressure vessel having a vertical conveyor arranged therein and a discharge pipe, the vertical conveyor beginning in the feed chamber and ending in the top region of the pressure vessel, and the discharge pipe beginning in the bottom region of the pressure vessel and leading out of the pressure vessel at the top, and a pressurizing device is provided which pressurizes the pressure vessel via a first valve and activates a conveying air nozzle of the discharge pipe via a second valve, and furthermore a controller is provided which is designed for filling the pressure vessel by means of the vertical conveyor and for fluidizing the material by means of the pressurizing device and for conveying said material away via the transport line. By the pressurizing device being designed in such a way that it serves not only to discharge the material but also to fluidize it, quick and efficient removal of the material from the pressure vessel can be achieved. Thanks to this efficiency, a compressor that belongs to the plant is suitable for the operation, and so the unloading plant according to the invention does not have to rely on assistance from external units. This is considerably advantageous in particular for ship applications since there is therefore no longer any need to depend on assistance from the shore.

The essence of the invention is the idea of combining the lifting function (of the low-lying storage bunker) and the conveying function over a distance (e.g. the transport from the ship to shore), such that both functions are integrated in one apparatus in a space-saving manner. To this end, the vertical conveyor is nested together with the discharge pipe in the pressure vessel. In this case, the vertical conveyor serves as an adequate receiver for bulk material, to be transported, in the pressure vessel, from which the bulk material is fluidized by means of the pressurizing device and delivered through the discharge pipe. The invention opens up the possibility of increasing the applied pressure to such an extent that simple and quicker transporting to the spatially remote delivery point can be achieved. The invention makes this possible without increasing the dimensions of the devices used for the transport of the bulk material and thus without increasing the construction space required. On the whole, therefore, this makes possible a space-saving and at the same time more efficient unloading plant.

Here, the expression "high level" refers to a level which corresponds approximately to the level of the top edge of the bunker (also designated as deck level in the case of ships), but at least to half the height of the bunker. It should be noted that the term "bunker" relates not only to low-lying storage bunkers but also to containers of high-rise stores, such as silos.

Furthermore, the invention is readily suitable for retrofitting. It is merely necessary to provide a lifting device having the pressure vessel, the vertical conveyor and the controller according to the invention in order to be able to achieve quicker unloading of the bunkers without increasing the size of the horizontal preliminary conveyor.

The vertical conveyor is preferably separated from the interior space of the pressure vessel by a dividing wall. This refers to the fact that the vertical conveyor is separated from the pressure vessel at least laterally, such that there is a connection to the interior space of the pressure vessel only at the top ejecting head thereof. The pressure isolation is thus ensured even at large pressure differences. The invention therefore opens the way to achieving the conveying of the bulk material from the low-lying storage bunker in both continuous and alternating operation.

In an advantageous embodiment, the vertical conveyor is designed as a conveying worm with vertically oriented axis. Readily controllable filling of the pressure vessel can be achieved by means of such a vertical conveying worm. Furthermore, it offers the advantage that effective sealing of the pressure vessel from the feed chamber and thus from the bunkers can be achieved with the material located between the convolutions of the worm. In this case, the drive of the conveying worm is located outside the pressure vessel.

The controller is preferably designed for batch operation of the pressure vessel. This means that, in a first working cycle, the pressure vessel is filled with material from the bunkers via the preliminary conveyor and, in a subsequent second working cycle, the material is fluidized and expelled via the transport device. However, thanks to the embodiment according to the invention of the vertical conveyor with the pressure vessel, continuous operation is also possible. The controller can therefore also be expediently designed for such operation. With a design for continuous operation, the controller enables quicker unloading times to be achieved. This is advantageous in particular when unloading operations are to be carried out as quickly as possible, because resources required therefor are limited and/or expensive, such as berths for ships at the quay.

In an alternative embodiment, the vertical conveyor is designed like an airlift having a vertical flow pipe and a lifting air nozzle arranged underneath. In this case, the lifting air nozzle is as a rule arranged coaxially below the vertical flow pipe. Gas flowing through the nozzle is therefore directed into the vertical flow pipe, in the course of which it entrains surrounding material and transports said material upward in the vertical flow pipe in order to eject it at the top end thereof. The embodiment with such an airlift offers the advantage of conveying with a low rate of abrasion, no movable element being arranged in the material itself. This is a considerable advantage in particular in the case of material susceptible to abrasion, such as coal or cement.

Provided in a proven embodiment is an additional non-return monitor which is designed for isolating certain bunkers via a valve if there is too low a level of the material in said bunkers. In the case of largely emptied bunkers, this prevents the pressure from escaping into the emptied bunkers via the preliminary conveying line.

The controller is preferably provided with filling level sensors for a full state and preferably also for an empty state of the pressure vessel. Furthermore, pressure sensors are expediently provided for a high pressure and a low pressure in the pressure vessel.

According to a preferred embodiment, the unloading apparatus according to the invention can be designed as a twin plant having at least one further lifting device. To this end, a changeover unit is provided which interacts with the controller in such a way that one of the lifting devices is filled with the material, while the material is delivered from the other. In this way, during periods when one of the lifting devices is being filled, conveying can be continued, namely via the other lifting device. Although the individual lifting devices are run in batch operation, virtually continuous operation is obtained. It should be noted that at least two lifting devices are required for this purpose, but more may also be provided. Embodiments having a plurality of lifting devices are also intended to come under the term "twin plant".

BRIEF DESCRIPTION OF THE DRAWINGS

The invention is explained below with reference to the attached drawings, in which exemplary embodiments are shown and in which:

FIG. 4 shows a flow chart for an unloading apparatus having a lifting device according to FIG. 3;

FIG. 6 shows a flow chart for an unloading apparatus having a lifting device according to FIG. 5.

The invention is explained below with reference to an exemplary embodiment which shows an unloading apparatus for bunkers of ships.

DETAILED DESCRIPTION OF THE INVENTION

Figure 1:
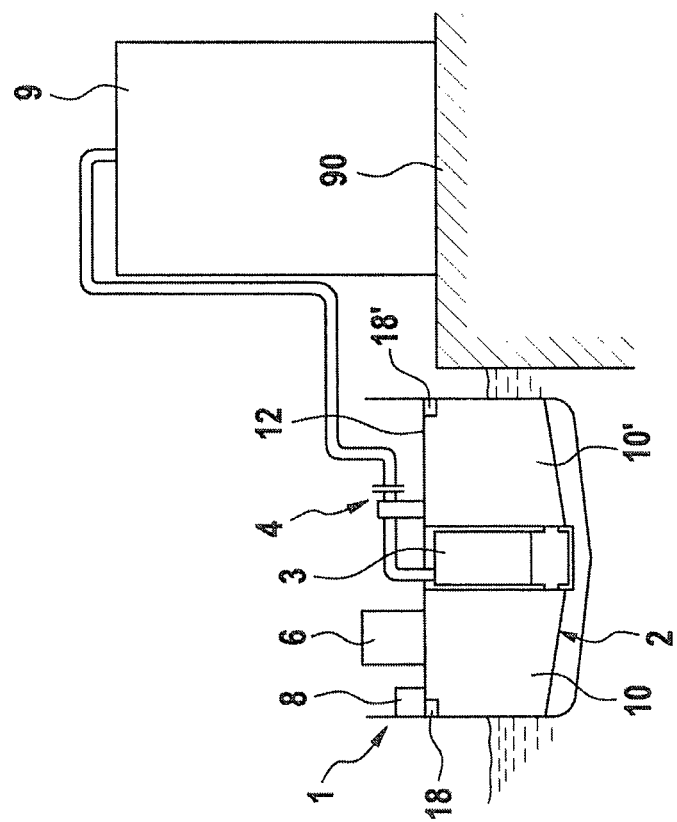
FIG. 1 shows an overall view of the exemplary embodiment for an unloading apparatus according to the invention.

FIG. 1 shows an overall view. The plant comprises a plurality of storage bunkers 10, 10' in a ship 1 which is unloaded via the unloading apparatus according to the invention, which will be described in more detail below.

A preliminary conveyor 2 is provided for conveying the material from the bunkers 10, 10' to the unloading apparatus. It is designed as a low-floor device and comprises fluidizing bottoms in the bunkers 10, 10'. The unloading apparatus serves to lift the material from the bottom level of the bunkers 10, 10' to the level of the deck 12 of the ship 1, from where it is conveyed via a transport line 4 to a silo 9 which is arranged fast on the shore in the vicinity of the quay 90.

Figure 3:
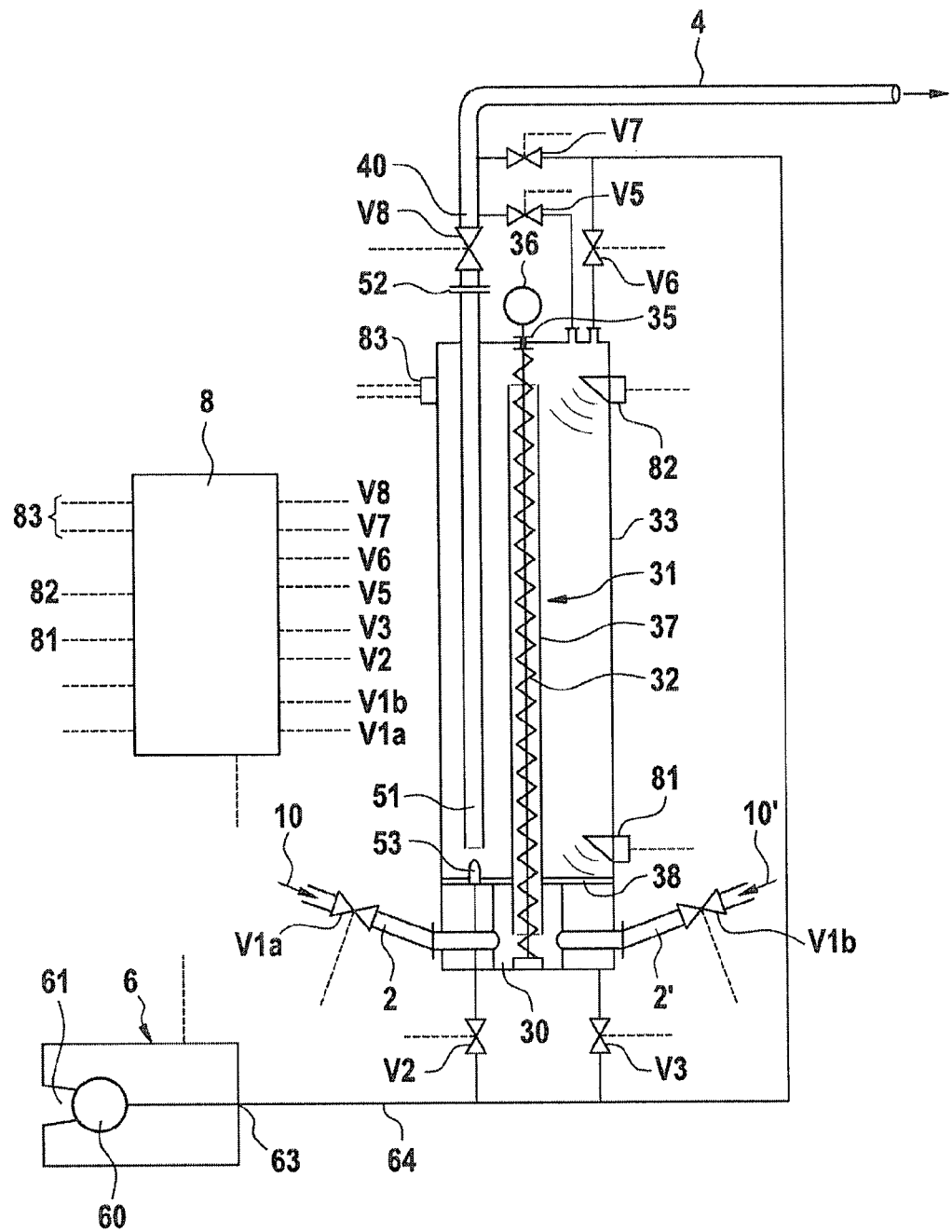
FIG. 3 shows a detailed view of the lifting device according to the exemplary embodiment shown in FIG. 1.

The key part of the lifting device 3 according to the invention is a pressure vessel 33 with a compressor plant 6 and an appropriately adapted controller 8. This is shown in more detail in FIG. 3.

At its bottom end, the pressure vessel 33 comprises a feed chamber 30, into which the low-floor preliminary conveyor 2 opens from the bunkers 10, 10'. It serves as a receiver for the bulk material. Furthermore, it has an aperture at the top end, through which a vertical conveyor 31 is directed. In the exemplary embodiment shown in FIG. 3, the vertical conveyor 31 is provided with a vertical conveying worm 32. The vertical conveying worm 32 extends over most of the height of the pressure vessel 33. The vertical conveying worm 32 extends substantially centrally along the center axis through the pressure vessel 33 and the drive shaft thereof is directed by means of a seal 35 through the top of the pressure vessel 33, where a drive motor 36 is arranged. The vertical conveying worm 32 is surrounded by a casing tube 37 over most of its length, to be more precise up to about 9/10 of the height of the pressure vessel 33. This ensures that material conveyed by the vertical conveying worm 32 is ejected at the top end of the casing tube 37, that is to say at about 9/10 of the height of the pressure vessel 33.

A discharge pipe 51 is arranged in the pressure vessel 33 in parallel with and in the opposite direction to the vertical conveyor 31. In the exemplary embodiment shown, it leads in one piece from a connection piece approximately above the top of the pressure vessel 33 downward through the top to just above the bottom of the pressure vessel 33. The discharge pipe 51 is open at its bottom end. The top end, lying outside the pressure vessel 33, of the discharge pipe 51 forms the delivery end 52 of the lifting device 3. Attached thereto is the transport line 4. A conveying air nozzle 53 is arranged below the discharge pipe 51 at the bottom of the pressure vessel 33, which is designed as a fluidizing bottom 38. Conveying air can be fed to said conveying air nozzle 53, as will be described in more detail below.

Also provided is a compressor plant 6, which provides air drawn in by means of a compressor 60 via an air intake funnel 61 and provides compressed air at an outlet 63 by means of an optional control orifice 62. The lifting device 3 is provided with compressed gas by means of said compressor plant 6 via an air distribution network designated overall by reference numeral 64; the preliminary conveyor 2 can also be supplied if required, although a suitable blower (not shown) is normally provided for this purpose. Furthermore, a plurality of controllable valves are provided, which are explained below. The pressure line of the air distribution network 64 is connected to the conveying air nozzle 53 via a valve V2 and to a bottom space via a valve V3, said bottom space surrounding the feed chamber 30. Furthermore, it is connected via a valve V6 to a pressurizing valve arranged on the top of the pressure vessel 33 and is also connected via a valve V7 to the transport line 4. Also provided are valves V1a, V1b which control the feeding of the material from the bunker 10, 10' via the preliminary conveyor 2 into the feed chamber 30. A delivery valve V8 is provided in the region of the delivery end 52.

Furthermore, height sensors 81, 82 for a low and a high filling level and a combined pressure sensor 83 are attached to the pressure vessel 33, said pressure sensor 83 having switches for a maximum pressure and a minimum pressure. The sensors 81 to 83 are connected to a control unit 8. Furthermore, the control unit 8 is designed for activating the valves V1 to V8. In addition, the control unit 8 monitors the compressor plant 6.

The operation of the unloading apparatus as an individual vessel is explained in more detail below with reference to FIG. 4.

At the start of the unloading process 100, the pressure vessel 33 is empty and pressureless. The unloading operation is started by the preliminary conveyor 2 conveying material from the bunkers 10, 10'. To this end, in a first step 102, the controller 8 opens the valves V1a, V1b and switches on the worm 32 (S) ("filling operation"). The compressor plant 6 (C) runs in order to pressurize the line 64 for supplying the pressure valves. In addition, the valve V7 is open in order to further empty the delivery line 4, and the valve V5 is open in order to vent the pressure vessel 33 toward the transport line 4. In the next step 104, the controller 8 monitors whether the top filling level sensor 82 indicates that the pressure vessel 33 is now filled with material (F). If this is the case, the controller 8 switches off the worm 32 in a step 106, since the pressure vessel 33 is now filled. At the same time, the valves V1a and V1b and V5 are closed. After that, the valve V7 is likewise closed, and the valves V3 and V6 are opened in order to pressurize the pressure vessel 33 at the pressure in the pressure line 64. In a step 108, the control unit 8 monitors, by means of the pressure sensor 83, the point at which a top pressure threshold H is reached. If it is reached, the control unit 8, in a following step 110, in addition to closing the valves V1a, V1b, V5 and V7, also switches the valve V6 into the closed position and leaves the switching state of the worm 32 and of the compressor plant 6 unchanged. Thus fluidizing air continues to be introduced via the valve V3 and the fluidizing bottom 38 into the pressure vessel 33, and transport air is blown in by the valve V2 via a nozzle 53, such that the material rises in the discharge pipe 51 and is lifted to the delivery end 52 at the top rim of the discharge pipe 51, from where it is transported away through the opened valve V8 via the transport line 4 ("delivery operation"). Transport of the material continues until the pressure vessel 33 is emptied, indicated by a signal from the filling level sensor 81 for low filling level (E) or indicated by the pressure sensor 53, which recognizes a low pressure threshold (L). If this check in step 112 is effected with a positive result, the transport operation is ended in a step 114 by the valves V2, V3 and V6 being closed and by the valves V5 and V7 being opened for venting the pressure vessel 33 and respectively for removing residual conveying quantities in the transport line 4. The valve V8 is closed. After a lag time in step 116 has expired, the next cycle is prepared by the vertical conveying worm 32 being started again, by the compressor plant 6 continuing to run and by the filling valves V1a, V1b being opened, whereupon the cycle continues with step 102.

The batch operation described above can be changed to continuous conveying by a modified control.

Figure 5:
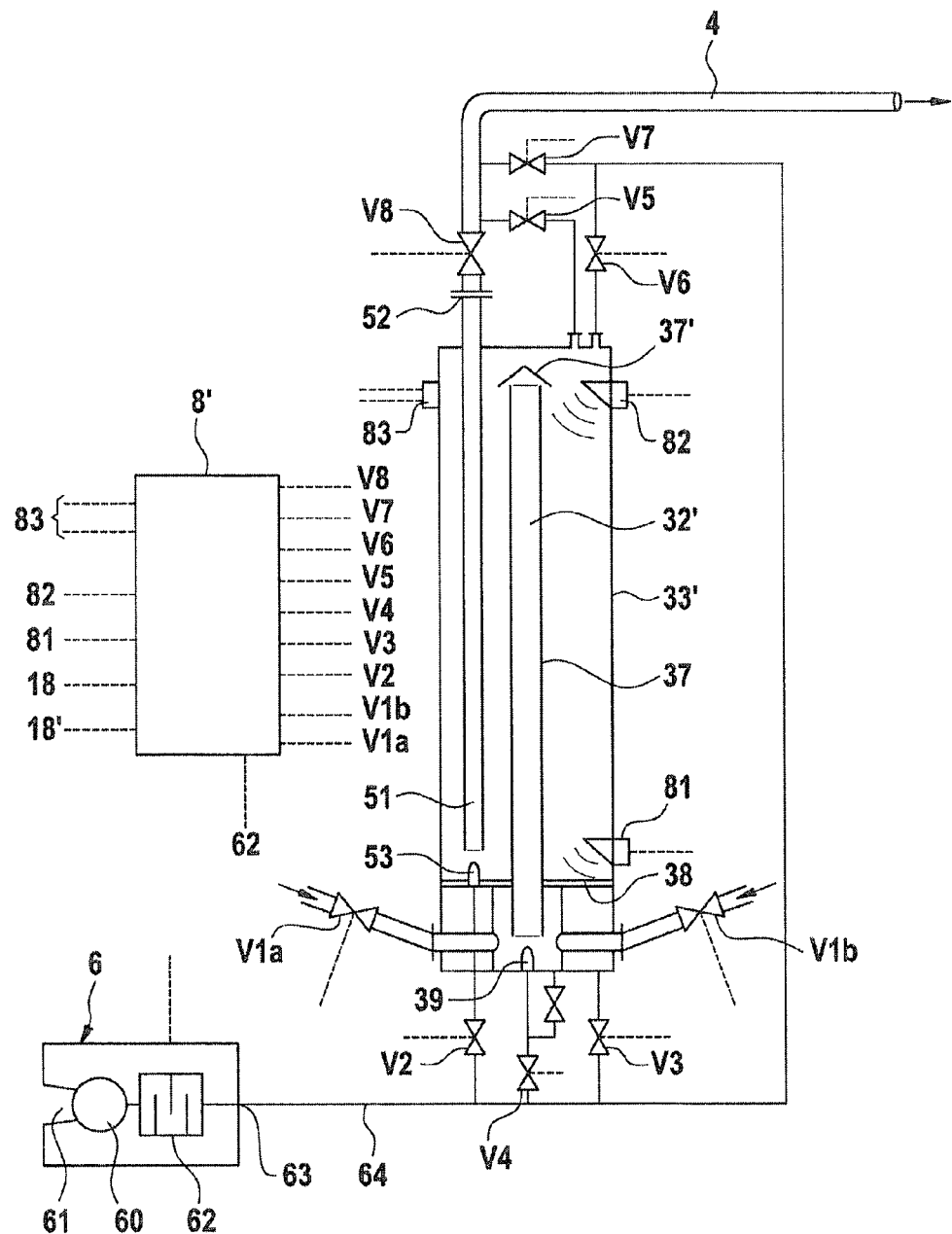
FIG. 5 shows a detailed view for another exemplary embodiment of the lifting device.

A second exemplary embodiment for the lifting device is shown in FIG. 5. It is based on the exemplary embodiment shown in FIG. 3, the same parts being designated with the same reference numerals. The difference lies substantially in the fact that an airlift 32' is provided instead of the vertical conveying worm 32. To this end, a nozzle 39 is arranged at the base of the feed chamber 30 coaxially to the casing tube of the vertical conveyor 31, said nozzle 39 being connected to the pressure line 64 via a valve V4. A baffle plate 37' of roof-shaped design which separates the gas from the material is provided at the top end of the casing tube 37 of the vertical conveyor 32'. The controller 8' is substantially similar to the controller 8. It differs merely in respect of its control properties with regard to some steps, as explained below.

The flow chart shown in FIG. 6 is a variant of the flow chart of the first exemplary embodiment shown in FIG. 4. After the start 100, the airlift 32' (A) is switched on in step 102' by actuating the valve V4. Furthermore, the compressor plant 6 (C) is operated and the valves V1a, V1b, V4 and V5 are open, while the valves V2, V3, V6 and V8 are closed. Also closed, in contrast to the first exemplary embodiment, is the valve V7 in order to avoid venting of the compressed gas line 64 required for the airlift 32'.

After it has been checked in step 104 that the top filling level (F) has been reached, the airlift 32' is stopped in step 106' by shutting the valve V4. The valves V3 and V6 are now opened for pressurizing the pressure vessel 33 with compressed gas. After it has been checked in step 108 that the top pressure threshold H is reached, the valve V6 is closed in the next step 110', and the valves V2 and V8 are opened for material in the pressure vessel 33' to be delivered via the pipe 51. When the pressure vessel 33' has been sufficiently emptied, as signaled by lowering of the filling level to the bottom limit value E or lowering of the pressure to the lower pressure threshold L, the valves V2 and V3 are closed in step 114', the valves V5 and V7 are subsequently opened, and the valve V8 is likewise closed. Once the pressure vessel 33' is vented after expiry of the lag time Δt, renewed filling is prepared in the following step 118'. To this end, the feed from the conveying bunkers 10, 10' is released by operating the valves V1a and V1b, pressure compensation with respect to the transport line 4 is effected via valve V5, and the airlift 32' is put into operation via the valve V4. The valves V2, V3, V6, V7 and V8 are closed, and the process starts again with step 102'.

The invention also concerns a conveying method as described above.

Inputs for the sensors 81, 82 and 83 of the pressure vessel 33 are provided on the control unit 8. Furthermore, inputs for filling level sensors 18, 18' in the bunkers 10, 10' are provided. With the aid of the signals transmitted from the sensors and with the aid of an integrated processing unit in which the flow chart shown in FIG. 4 or 6 is implemented, the controller 8 determines switching pulses for the valves V1a to V8 and the compressor plant 6.

Figure 2:
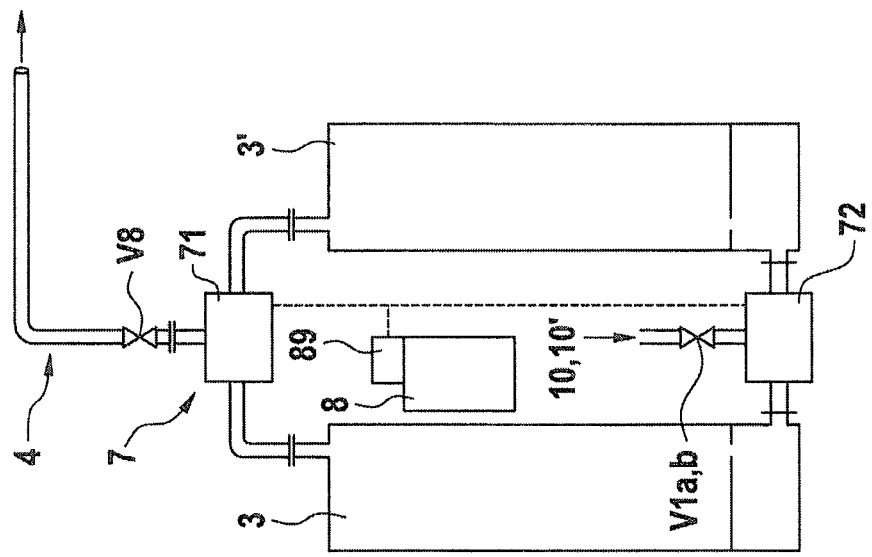
FIG. 2 shows a schematic illustration of a further exemplary embodiment.

A further embodiment is shown in FIG. 2. This is a twin plant which has two (or more) lifting devices 3, 3' and which is operated by a common controller 8 and compressor plant 6. The lifting devices 3, 3' can be arranged at a distance from one another, for example one for the forward cargo holds and one for the aft cargo holds of the ship 1. The individual lifting devices 3, 3' are constructed as in the embodiment shown in FIG. 3 and no further explanation is required in this respect. The controller 8 has a pendulum operating mode 89. Connected thereto is a changeover device 7 which controls the feed of the material to the individual lifting devices 3, 3' and the transport via the transport line 4. In this case, the controller 8 together with the pendulum operating module 89 interacts with the changeover device 7 in such a way that one of the lifting devices 3 is filled with the material from the storage bunkers 10, 10', while the other lifting device 3' delivers the material, already located in the pressure vessel thereof, via the transport line 4. One lifting device 3 is therefore carrying out the filling operation and the other 3' is carrying out the delivery operation. If the lifting devices 3, 3' are filled with material or if the material is already delivered therefrom, changeover is effected and the lifting device 3 now filled changes to the delivery operation and the lifting device 3' now emptied is loaded again with material in the filling operation.

The changeover device 7 can be divided into components 71, 72, 72' which change over the inflow of material from the storage bunkers 10, 10' like a directional control valve and accordingly also alternately connect the delivery ends 52 to the common transport line 4. However, provision may also be made for this functionality to be completely integrated into the controller 8 together with the pendulum operating mode 89 thereof, in which case the valves V1a, 1b, which are present anyway, are used for releasing or shutting off the feed of material from the storage bunkers 10, 10' and respectively the valve V8 on each lifting means is used for shutting off or opening the transport line 4. This variant offers the advantage that it requires no additional hardware—except for the second lifting device—and is therefore both cost-effective and operationally reliable.

The invention claimed is:

1. An unloading apparatus for low-lying storage bunkers, comprising:
   a feed chamber for receiving material from storage bunkers at a bottom level;
   a lifting device for lifting the material to a high level, the lifting device comprising,
   a discharge pipe with a delivery end to which a transport line for conveying the material away to a spatially remote delivery point can be connected,
   a pressure vessel having
      a vertical conveyor arranged therein, the vertical conveyor having a first end located in the feed chamber and a second end in a top region of the pressure vessel, and
      a discharge pipe with a first end in a bottom region of the pressure vessel and leading out of the pressure vessel with the delivery end of the discharge pipe;
   a pressurizing device which pressurizes the pressure vessel via a first valve and activates a conveying air nozzle of the discharge pipe via a second valve; and
   a controller designed for filling the pressure vessel by means of the vertical conveyor, fluidizing the material by means of the pressurizing device and conveying the material away via the delivery end of the discharge pipe and the transport line.

2. The unloading apparatus of claim 1, wherein the vertical conveyor is separated in interior space of the pressure vessel by a dividing wall.

3. The unloading apparatus of claim 1, wherein the vertical conveyor is designed as a conveying worm with a vertically oriented axis.

4. The unloading apparatus of claim 1, wherein the vertical conveyor is designed as an airlift having a vertical flow pipe and a filling air nozzle arranged underneath.

5. The unloading apparatus of claim 1, wherein the pressure vessel has a fluidizing bottom.

6. The unloading apparatus of claim 1, wherein the controller is designed for batch operation.

7. The unloading apparatus of claim 1, wherein the controller is designed for continuous operation.

8. The unloading apparatus of claim 1, wherein the apparatus is designed as a multiple plant having at least one additional lifting device, a common transport line, a changeover unit that interacts with the controller so that one of the lifting devices is filled with material delivered from the other.

* * * * *